(12) United States Patent
Sall et al.

(10) Patent No.: US 12,453,972 B2
(45) Date of Patent: Oct. 28, 2025

(54) MICROSYSTEM LABEL FOR SAMPLE TUBES

(71) Applicant: FONDATION INSTITUT PASTEUR DE DAKAR, Dakar (SN)

(72) Inventors: Amadou Alpha Sall, Dakar (SN); Cheikh Tidiane Diagne, Dakar (SN); Sidy Ndao, Lincoln, NE (US)

(73) Assignee: FONDATION INSTITUT PASTEUR DE DAKAR, Dakar (SN)

( * ) Notice: Subject to any disclaimer, the term of this patent is extended or adjusted under 35 U.S.C. 154(b) by 494 days.

(21) Appl. No.: 17/776,135

(22) PCT Filed: Nov. 12, 2020

(86) PCT No.: PCT/US2020/060251
§ 371 (c)(1),
(2) Date: May 11, 2022

(87) PCT Pub. No.: WO2021/097100
PCT Pub. Date: May 20, 2021

(65) Prior Publication Data
US 2022/0395836 A1    Dec. 15, 2022

Related U.S. Application Data

(60) Provisional application No. 62/934,411, filed on Nov. 12, 2019.

(51) Int. Cl.
*B01L 3/00* (2006.01)
*B01L 9/06* (2006.01)

(52) U.S. Cl.
CPC .............. *B01L 3/5453* (2013.01); *B01L 9/06* (2013.01); *B01L 2200/147* (2013.01);
(Continued)

(58) Field of Classification Search
CPC .... B01L 3/5453; B01L 9/06; B01L 2200/147; B01L 2200/185; B01L 2300/022;
(Continued)

(56) References Cited

U.S. PATENT DOCUMENTS

| 5,443,791 A | 8/1995 | Cathcart et al. |
| 2001/0049147 A1 | 12/2001 | Bierre et al. |

(Continued)

FOREIGN PATENT DOCUMENTS

| CN | 109087989 A | * 12/2018 | ............. H10N 10/17 |
| JP | 2005125144 A | 5/2005 | |

(Continued)

OTHER PUBLICATIONS

Koch, et al. "Skin attachable flexible sensor array for respiratory monitoring." Sensors and Actuators A: Physical 250 (Oct. 15, 2016): 138-144. Entire Document. (Year: 2016).*

(Continued)

*Primary Examiner* — Jennifer Wecker
*Assistant Examiner* — Britney N. Washington
(74) *Attorney, Agent, or Firm* — Seed Intellectual Property Law Group LLP

(57) ABSTRACT

The present invention relates to a system which permits securing an electronic label on a test tube. In particular, it refers to an Internet of Things (IoT) based platform for real-time remote sensing and monitoring of specimen transportation and banking. The technology is based on an interconnected smart collecting tubes and transportation box monitored with a remote digital interface, allowing real-time sample monitoring of key parameters such as sample identification, temperature, volume, geolocalization, sealing and bio-banking.

20 Claims, 3 Drawing Sheets

(52) U.S. Cl.
CPC ... *B01L 2200/185* (2013.01); *B01L 2300/022* (2013.01); *B01L 2300/0645* (2013.01); *B01L 2300/1827* (2013.01)

(58) Field of Classification Search
CPC ..... B01L 2300/0645; B01L 2300/1827; B01L 2300/023; B01L 2300/024; B01L 2300/1894
See application file for complete search history.

(56) References Cited

U.S. PATENT DOCUMENTS

| | | | |
|---|---|---|---|
| 2010/0025464 | A1 | 2/2010 | Trueeb et al. |
| 2013/0082099 | A1* | 4/2013 | Furrer ................ B01L 3/50825 235/487 |
| 2013/0106607 | A1 | 5/2013 | Clement et al. |
| 2013/0157271 | A1* | 6/2013 | Coursey ............... H05B 1/0297 435/6.12 |
| 2017/0239139 | A1* | 8/2017 | Scully, Jr. ............... A61J 1/165 |
| 2017/0337461 | A1 | 11/2017 | Jesme et al. |
| 2018/0053023 | A1 | 2/2018 | Yaginuma et al. |
| 2019/0200890 | A1 | 7/2019 | Toth et al. |

FOREIGN PATENT DOCUMENTS

| | | |
|---|---|---|
| JP | 2018028488 A | 2/2018 |
| WO | WO 2012120497 A1 | 9/2012 |
| WO | WO 2017025789 A1 | 2/2017 |
| WO | WO 2017211708 A1 | 12/2017 |

OTHER PUBLICATIONS

Wu, et al. "Microfluidic stretchable radio-frequency devices." Proceedings of the IEEE 103.7 (Jun. 1, 2015): 1211-1225. Abstract, p. 1217 col. 1 para 2-col. 2 para 1; p. 1222 col. 2 para 2-p. 1223 col. 1 para 1, Figure 7; Figure 13. (Year: 2015).*

Koch et al., "Skin attachable flexible sensor array for respiratory monitoring," *Sensors and Actuators A Physical*, Accepted Manuscript available online Sep. 15, 2016. (17 pages).

Wu et al., "Microfluidic Stretchable Radio-Frequency Devices," *Proceedings of the IEEE* 103(7):1211-1225, Jul. 2015 [Published online Jun. 1, 2015]. (15 pages).

* cited by examiner

MICROSYSTEM LABEL FOR SAMPLE TUBES

TECHNICAL FIELD OF THE INVENTION

The present invention relates to a system which permits securing an electronic label on a test tube. In particular, it refers to an Internet of Things (IoT) based platform for real-time remote sensing and monitoring of specimen transportation and banking. The technology is based on an interconnected smart collecting tubes and transportation box monitored with a remote digital interface, allowing real-time sample monitoring of key parameters such as sample identification, temperature, volume, geolocalization, sealing and bio-banking.

BACKGROUND OF THE INVENTION

There are a number of intelligent portable carrier devices known in the art, useful for the temporary storage or for the transportation of sterile and non-sterile medical implants, biologic products, or other materials that require continuous monitoring during transportation.

In this sense, WO2017025789 which relates to the field of transport and preservation of fluids, materials and biological tissues, describes that both preservation and transport of biological material mostly concerning health field or the like, comprises a series of complicated procedures to comply with and it is strictly controlled by legal and health regulations. In particular, this document states the following:

"Nowadays it is known to the operators that the transport of said materials done by an operator, although it is an operation subject to many rules, as hereinbefore said, is carried out through simple thermal or cooled sealed containers or provided with ice bars or conventional small commercial refrigerators, but not specific ones. It appears immediately obvious that for both cases extraordinary problems occur; for sealed containers it is difficult to set a desired temperature, both hot and cold, and above all to keep it constant, for small commercial refrigerators instead the transport is easier and more reliable, and temperature should be regulated. But it is known that commercial refrigerators are characterized by a very approximate temperature regulation, and they usually do not give information when the temperature is affected by a variation respect to the one set, unless important thermal shocks. Anyhow information concerning the temperature inside the refrigerator are not given, there is not any monitoring of its openings that could cause the contained biological material or organ to be affected by thermal shocks".

In order to solve the above said problem, WO2017025789 discloses a device for transporting biological materials or the like, which is provided with an inner accurate monitoring of the temperature in real time, which is said to be versatile, reliable, and efficient for maintaining material cooling and heating temperatures. Such device provides means for the real time monitoring of the device position, and the device tracking, for example via a GPS system or suitable system. Such device provides means for controlling and regulating the device openings, duration of such openings and any material removal and insertion, such monitoring of extracted or inserted material is performed by tags or the like. Such device is able to interact in real time with the surrounding environment and can be controlled in real time. Such device provides means for data storage for further checks.

In addition, US 20130106607 also provides for a device for transporting biological materials or the like, comprising product identification technology, such as radio-frequency identification (RFID) tags and readers to uniquely identify the regulated products as they are added to or removed from an intelligent portable carrier device. A primary, but not exclusive purpose of the intelligent portable carrier device of US 20130106607 is as a temporary storage process for transportation purposes of sterile and non-sterile medical implants, biologic products, or other RFID enabled materials that require continuous monitoring during transportation.

However, none of the intelligent portable carrier devices known in the art, are capable of securing pre-analytical and bio-banking steps from the field by monitoring volume, monitoring and adjusting temperature, providing sample identification, and sealing and positioning in real-time from a remote operating interface. Such device shall be particularly useful for epidemics investigation in low resources settings to contain outbreaks is the early detection and identification of pathogens. This is due to the fragmented nature of lab distribution and logistics to safely and reliably collect and transport samples for quick processing.

DETAILED DESCRIPTION OF THE INVENTION

Figure 1A:
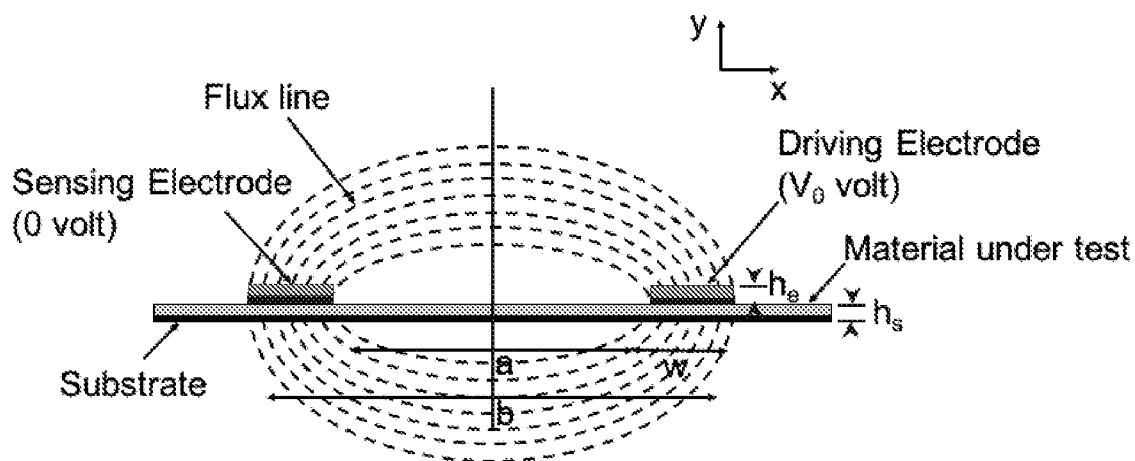
FIG. 1. A) The parallel plate fringe capacitance method; B) multiple sets of cascading electrodes for the capacitative fluid level sensor.

The authors of the invention propose the development of an Internet of Things (IoT) based platform for real-time remote sensing and monitoring of specimen transportation and banking. The technology is based on an interconnected smart collecting tubes and transportation box monitored with a remote digital interface, allowing real-time sample monitoring of key parameters such as sample identification, temperature, volume, geolocalization, sealing and bio-banking.

Currently the biggest challenge for epidemics investigation in low resources settings to contain outbreaks is the early detection and identification of pathogens. This is due to the fragmented nature of lab distribution and logistics to safely and reliably collect and transport samples for quick processing. The approach of the invention to solve this problem is to secure pre-analytical and bio-banking steps from the field by using smart connected devices. Volume, temperature, sample identification, sealing and positioning will be monitored in real-time from a remote operating interface.

The proposed solution thus consists of two thrusts:
  The development of stretchable and wearable microfluidics thin film labels for sample tubes (from hereinafter the microfluidic thin label). Wearable thin film microfluidics technologies have been used for biosensing applications, including in situ sweat metabolites analysis, vital signs monitoring, and gait analysis. Similar technology will be used as a sticker label for the sample tubes. The label will measure temperature (includes means for measuring temperature, specifically a resistance temperature detector (RTD)), sample volume (includes means for measuring volume), while storing sample information via an on-chip integrated RFID tag. Additionally, and most importantly, the microfluidics based label will also include means for controlling temperature.

In particular, such stretchable and wearable microfluidic labels allow for each tube to be cooled and heated individually via an integrated thermoelectric (TEC) cooler fabricated on the thin film label. A PID controller is used to control the temperature of each tube based on desired set-point and temperature readout from the RTD sensors. The desired set temperature of each tube is manually coded into the RFID tag of the tube.

The development of an integrated cloud-connected transportation box. The primary function of the box, besides physical storing the samples by providing a slot/compartment for each tube, is the interface between the samples and the cloud server. Furthermore, the box also provides additional functions. These technical innovations will reduce sample transportation turn-around time and enable a high-quality sample preservation, optimal aliquoting and an efficient and easy biobank management.

More specifically each tube slot/compartment of the transportation box has an integrated RFID reader. Upon placing the tube inside a given slot, the RFID tag is scanned and the set temperature communicated to the on-board microcontroller/computer. Preferably instead of connecting each tube TEC micro-cooler to its own PID controller, we use multiplexing electronics to allow all of the tubes in the transportation box to share a single output wire.

Temperature of each tube is measured using a resistance temperature detector (RTD) made of copper with a positive temperature coefficient (PTC). The copper RTDs are designed and fabricated on the thin film label. Since electrical resistance is proportional to temperature, using a stored calibration curve, we can measure the temperature of each tube by passing a small current through the thin film RTDs and measuring the voltage.

Figure 5:
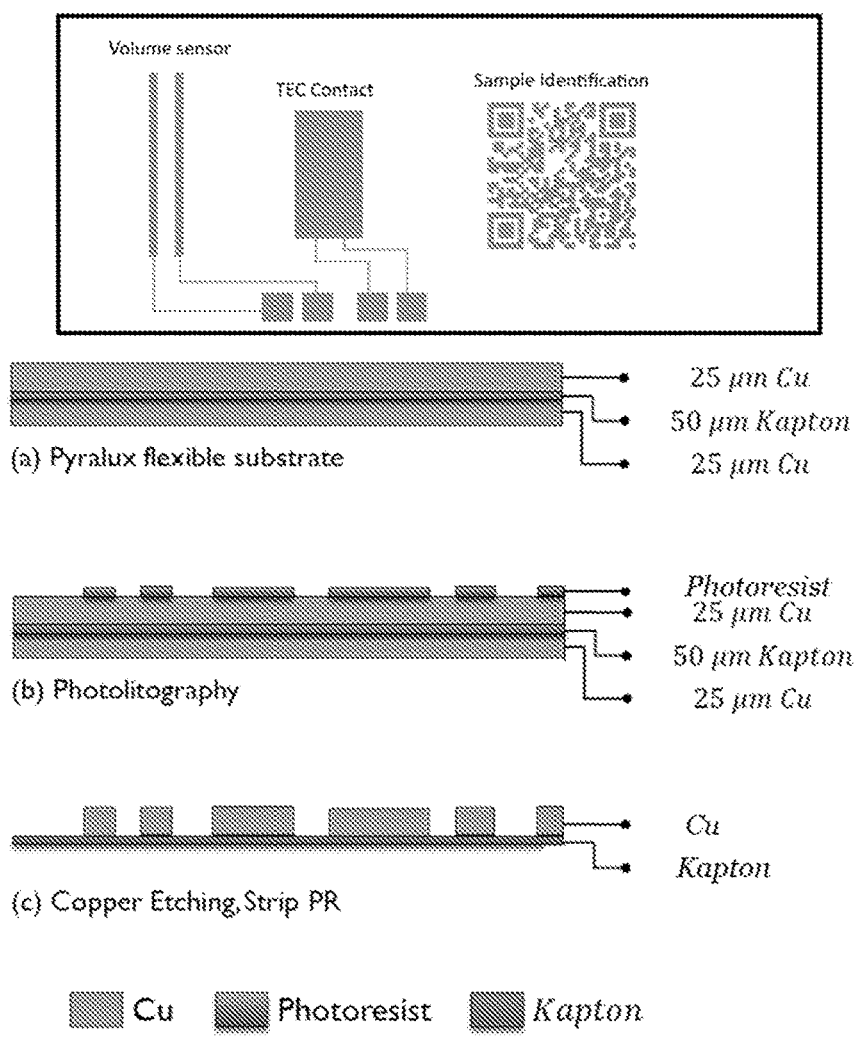
FIG. 5. The microfabrication process flow of the thin layer label.

It is further noted that the stretchable and wearable microfluidic thin labels of the present invention are constructed by using standard micro/nanofabrication techniques. In particular, the thin film labels are fabricated and packaged by preferably using low-cost and readily available materials such as DuPont™ Kapton® (polyimide film formed by polymerizing aromatic dianhydride and aromatic diamine) substrates. As shown in FIG. 5, thin film electrical conductors and metal (copper) connectors are fabricated on-chip using photolithography and wet etching to add the temperature and volume sensor, as well as the thermoelectric microcooler and on-chip RFID tag. When packaged, the thin film micro-cooler label is attached to the outside wall of the Eppendorf tube. Because the thin film label wraps around the test tube, sample liquid level can be easily measured using a capacitance approach.

The first step in the microfabrication of the microfluidic thin label is designing and fabricating a photomask containing all the copper sensors and connectors that are used for TEC contacts, volume sensor, and sample identification code. We use Pyralux flexible substrate, which consists of Kapton® (polyimide film formed by polymerizing aromatic dianhydride and aromatic diamine) layer covered by two copper layers on the front and back sides, then a photoresist layer is applied on the front side. The mask is used in the photolithography process to pattern the sensors and connectors on the substrate front side. The exposed photoresist is developed in a solution; the desired sensors and connectors are fabricated on the front side via wet etching and striping the remaining photoresist. In addition, we fabricate the thermoelectric micro-cooler by depositing p-type $Sb_2Te_3$ and n-type $Bi_2Te_3$ films via thermal co-evaporation of the constituent elements on the connectors.

Therefore, the present invention thus provides a stretchable and wearable microfluidic thin label for sample or test tubes. Such label is capable of locally and individually (per test tube sample) monitoring temperature, volume and sample information and capable of locally and individually (per sample) cooling and/or heating samples. Such means are based on thin film microfluidics sample tube labels using standard micro/nanofabrication techniques. Such thin film electrical conductors, insulators, and metal connectors will be fabricated on-chip using thin film deposition technologies such as sputtering and e-beam evaporation to add the temperature and volume sensor, as well as the thermoelectric micro-cooler and on-chip RFID tag. When packaged, the proposed microfluidics label can be attached to the outside wall of the test tube, it is thus in intimate contact with the test tube. Because the thin film microfluidics label wraps around the test tube, sample liquid level will be easily measured using a capacitance approach.

Hence, a first aspect of the invention refers to a microfluidics thin film label for registering and for transferring information relating to a test tube, wherein said microfluidics thin film label is capable of being mounted or directly printed on the outside surface of the test tube, and wherein said label comprises: means for individually cooling and heating a test tube; means for measuring the temperature of the test tube; means for monitoring the volume of the sample within the test tube; and means to storage sample information.

Figure 1B:
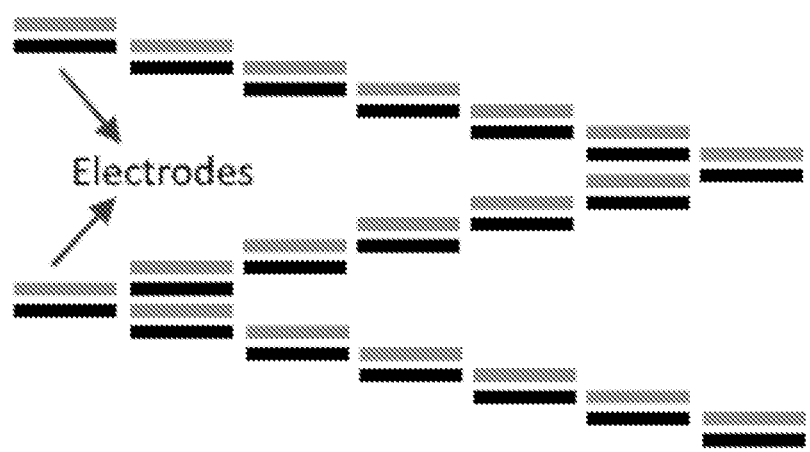

In a preferred embodiment of the invention, the means for monitoring the volume of the sample within the test tube is a capacitive fluid level sensor which comprises a set of thin film electrode strips mounted so that these contact with the sample tube outside wall. It is noted, that there are a multiple methods to do a contactless (or non-contact) measurement of fluid level in a test tube. One approach adopted, in a non-liming manner, to practice the present invention is the parallel plate fringe capacitance method, FIG. 1A. The sensor consists of a set of thin film electrode strips in contact with the sample tube outside wall. A low frequency sinusoidal voltage signal is applied to the driving electrode which creates fringing electric field lines in the biosample within the tube. The strength of the fringing fields can be directly correlated to the dielectric constant of the biosample. In this manner, the sensor shall consist of multiple sets of cascading electrodes, FIG. 1B, which allow to accurately measure the level (i.e., volume) of the biosample inside the tube.

Figure 2:
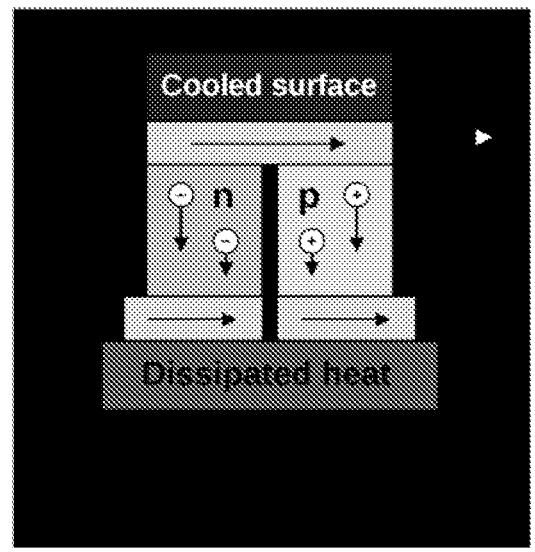
FIG. 2. This figure shows the thermoelectric effect, understood as the direct conversion of temperature differences to electric voltage and vice versa.

In another preferred embodiment of the invention, the means for controlling the temperature of the test tube is a thermoelectric micro-cooler fabricated by depositing p-type $Sb_2Te_3$ and n-type $Bi_2Te_3$ films via thermal co-evaporation of the constituent elements on the connectors. In this sense, it is noted that, biosamples are usually transported using Polystyrene Box/Ice Box full of ice. Such cold storage method is very inefficient, chaotic, and does not allow individual sample tubes to be cooled at different temperatures. As an improved alternative, the present invention allows for low-energy targeted cooling of individual biosample tubes using solid-state Thermoelectric (TE) coolers. The thermoelectric effect (FIG. 2) is the direct conversion of temperature differences to electric voltage and vice versa. A thermoelectric cooler creates a temperature difference when a voltage is applied to it. The thermoelectric merit is defined as: $ZT=S2\sigma T/\kappa$, where T is the absolute temperature, a is the electrical conductivity, K is the thermal conductivity, and S is the Seebeck coefficient (defined as voltage difference divided by temperature difference ($\Delta V/\Delta T$)).

Using electron beam (e-beam) evaporation, thermoelectric thin films (~100 nm) of Sb2Te3 are grown and patterned into modules on the sample tube label. The micro/nanofabricated TE coolers are powered individually by the battery pack located in the transportation box.

In another preferred embodiment of the invention, the means for heating the test tube is through microheaters deposited on the electronic memory label. In this sense, in addition to cooling, the sample tube label will be able to also heat biosamples. This is achieved through microheaters deposited on the sample tube label. These microheaters work on the basis of joules heating and can be fabricated with gold or platinum thin films. The power dissipated from the microheaters is proportional to the current and the electrical resistance of the heater. The latter can be carefully tuned through the microheaters' cross sectional area and length. The microheaters may be fabricated on the surface of the label through e-beam evaporation and a lift-off process.

Besides heating, the thin film microheaters may also be used as temperature sensors during both cooling and heating processes. This is achieved by taking advantage of the heaters' resistance temperature dependence (RTD). Each microheater is calibrated to correlate its electrical resistance as a function of temperature. In sensing mode, a very small current is supplied to the heaters (RTDs) and voltage is measured to determine the electrical resistance. From the electric resistance the heaters, the temperature of the biosamples can deduced.

In yet another preferred embodiment of the invention, the means to storage sample information is by using a Radio-Frequency Identification, RFID, film chip and antenna printed on the surface of the electronic memory label. Radio-Frequency Identification, RFID, thin film chip and antenna may be printed on the surface of the sample tube label to store information such as ID, sample name, patient information, temperature, power, and fluid level. Power to the chip is provided by from the transportation box.

In yet another preferred embodiment of the invention, the first step in the microfabrication of the thin layer label is designing and fabricating a photomask containing all the copper sensors and connectors that are used for TEC contacts, volume sensor, and sample identification code. We preferably use Pyralux flexible substrate, which consists of Kapton® (polyimide film formed by polymerizing aromatic dianhydride and aromatic diamine) layer covered by two copper layers on the front and back sides, then a photoresist layer is applied on the front side. The mask is used in the photolithography process to pattern the sensors and connectors on the substrate front side. The exposed photoresist is developed in a solution; the desired sensors and connectors are fabricated on the front side via wet etching and striping the remaining photoresist. In addition, we fabricate the thermoelectric micro-cooler by depositing p-type $Sb_2Te_3$ and n-type $Bi_2Te_3$ films via thermal co-evaporation of the constituent elements on the connectors.

Therefore, in a preferred embodiment of the first aspect of the invention, the present invention refers to a microfluidic thin label, wherein said microfluidic thin label is capable of being mounted on the outside surface of a test tube, and wherein said label comprises thin film electrical conductors and metal (copper) connectors fabricated on-film, preferably using photolithography and wet etching, to add to the connectors a temperature and volume sensoring means, as well as a thermoelectric microcooler, an on-film RFID tag and a PID controller; wherein the temperature sensor is a resistance temperature detector (RTD) made of copper with a positive temperature coefficient (PTC) mounted so that this detector is in contact with the sample tube outside wall, wherein the thermoelectric micro-cooler is deposited on the film by p-type $Sb_2Te_3$ and n-type $Bi_2Te_3$ films via thermal co-evaporation of the constituent elements on the connectors, wherein said thermoelectric micro-cooler is mounted so that this is in contact with the sample tube outside wall, wherein the means for monitoring the volume of the sample within the test tube is a capacitive fluid level sensor which comprises a set of thin film electrode strips mounted so that these contact with the sample tube outside wall, and wherein the PID controller is used to control the temperature of each tube based on desired set-point and temperature readout from the RTD sensors.

Preferably, the desired set temperature of each tube is manually coded into the RFID tag of the tube.

In another preferred embodiment of the first aspect of the invention or of any of its preferred embodiments, said label is powered directly from a battery pack stored in an integrated cloud-connected transportation box.

A second aspect of the invention provides a test tube which comprises the microfluidic thin label of the first aspect of the invention or of any of its preferred embodiments mounted or directly printed on the outside surface of the test tube.

Figure 3:
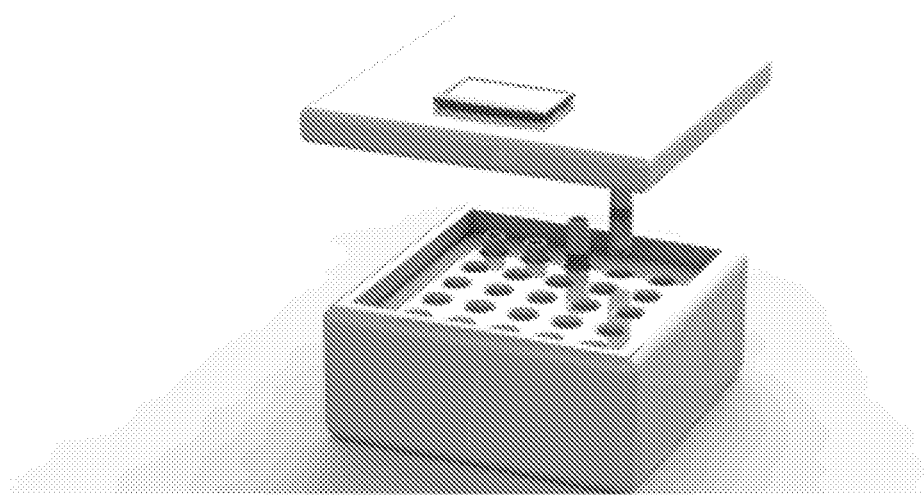
FIG. 3. The integrated cloud-connected transportation box.
Figure 4:
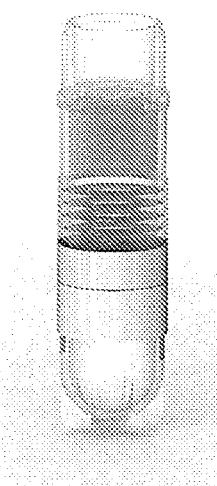
FIG. 4. A schematic drawing of a test tube with the label of the proposed invention.

It is further noted that, as already stated, the microfluidic thin label of the first aspect of the invention, can be mounted or directly printed on the outside surface of a sample tube and is powered directly from a battery pack stored in an integrated cloud-connected transportation box as shown in FIG. 3. The primary function of the box, besides physical storing the sample tubes, is to house the electronics, batteries, and to act as the interface between the samples and the cloud server. The box therefore consists of a secured sample holder with integrated wireless communication electronics. Sample RFID tags are read and stored within the box microcontroller. Sample information, lot number, along with box GPS location are sent in real-time to a cloud-based server which can be accessed via a web browser or mobile App. Because heating and cooling of sample occurs locally and therefore requires relatively low heat load, small solar rechargeable batteries will be used as the box main power source. Each sample tube slot in the box is fitted with connectors and leads which allows for the transfer of energy as well as data between the box and the sample tube. To ensure the safety of the samples, physical access to the box will be encrypted with access allowed only to authorized personnel.

In addition, as already stated, upon placing the tube inside a given slot, the RFID tag is scanned and the set temperature communicated to the on-board microcontroller/computer. Preferably instead of connecting each tube TEC microcooler to its own PID controller, we use multiplexing electronics to allow all of the tubes in the transportation box to share a single output wire.

Therefore, a third aspect of the invention provides an intelligent portable carrier device or an integrated cloud-connected transportation box, comprising:
  a. a housing including a lid-closure mechanism, wherein the housing is configured to hold the test tubes, and comprise means for tracking and monitoring said test tubes using product identification technology to uniquely identify the said test tubes as they are added to or removed from the device;

b. a battery pack to directly powered the electronic memory labels mounted or directly printed on the outside surface of the test tubes;

c. integrated wireless communication electronics to act as the interface between the test tube samples and a cloud server.

In a preferred embodiment of the third aspect of the invention, the product identification technology comprises radio-frequency identification (RFID) technology.

In another preferred embodiment of the third aspect of the invention, the intelligent portable carrier device further comprises a global positioning receiver module for receiving signals from a global positioning system (GPS) and determining a location of said intelligent portable carrier device.

In another preferred embodiment of the third aspect of the invention, the intelligent portable carrier device further comprises at least one sensor module for monitoring an environmental condition within the intelligent portable carrier device.

In another preferred embodiment of the third aspect of the invention, the intelligent portable carrier device further comprises interior walls constructed from an RF absorptive material to contain RF emitted energy, wherein preferably the absorptive material is carbon fiber.

In another preferred embodiment of the third aspect of the invention, the battery pack are solar re-chargeable batteries.

In another preferred embodiment of the third aspect of the invention, the physical access to the intelligent portable carrier device will be encrypted with access allowed only to authorized personnel.

Finally, in yet another preferred embodiment of the third aspect of the invention, upon placing the tube inside a given slot, the RFID tag is scanned and the set temperature communicated to the on-board microcontroller/computer, wherein instead of connecting each tube TEC micro-cooler to its own PID controller, we use multiplexing electronics to allow all of the tubes in the transportation box to share a single output wire.

The invention claimed is:

1. A stretchable and wearable microfluidics thin film label for a sample tube, wherein said microfluidics thin film label is capable of being mounted or directly printed on the outside surface of the sample tube, and wherein said label comprises thin film electrical conductors and metal connectors fabricated on-film, and on the connectors: means for individually cooling and heating a test tube; means for measuring the temperature of the test tube; means for monitoring the volume of the sample within the test tube; and means to store sample information, wherein the means for individually cooling and heating the test tube is a thermoelectric micro-cooler fabricated by depositing p-type $Sb_2$, $Te_3$ and n-type $Bi_2Te_3$ films via thermal co-evaporation of the constituent elements on the connectors, and the thermoelectric micro-cooler is configured to be mounted so that the means are in contact with the sample tube outside wall.

2. The microfluidics thin film label of claim 1, wherein the means for measuring the temperature of the test tube is a resistance temperature detector (RTD) made of copper with a positive temperature coefficient (PTC) mounted so that this detector is in contact with the sample tube outside wall and wherein the thin film label further comprises a PID controller to control the temperature of each sample tube based on a desired set-point and temperature readout from the RTD sensors.

3. The microfluidics thin film label of claim 2, wherein the means for monitoring the volume of the sample within the sample tube is a capacitive fluid level sensor which comprises a set of thin film electrode strips mounted so that these contact with the sample tube outside wall.

4. The microfluidics thin film label of claim 3, wherein the means to store sample information is by using a Radio-Frequency Identification, RFID, film chip and antenna printed on the surface of the label.

5. The microfluidic thin label of claim 1, wherein said microfluidic thin label is capable of being mounted on the outside surface of the sample tube, and wherein said label comprises thin film electrical conductors and copper connectors fabricated on-film to add to the connectors a temperature and volume sensing means, as well as a thermoelectric microcooler, an on-film RFID tag and a PID controller; wherein the means for measuring the temperature of the test tube is a resistance temperature detector (RTD) made of copper with a positive temperature coefficient (PTC) mounted so that this detector is in contact with the sample tube outside wall, wherein the thermoelectric microcooler is deposited on the film by p-type $Sb_2Te_3$ and n-type $Bi_2Te_3$ films via thermal co-evaporation of the constituent elements on the connectors, wherein said thermoelectric micro-cooler is mounted so that it is in contact with the sample tube outside wall, wherein the means for monitoring the volume of the sample within the test tube is a capacitive fluid level sensor which comprises a set of thin film electrode strips mounted so that they contact with the sample tube outside wall, and wherein the PID controller is used to control the temperature of each sample tube based on a desired set-point and temperature readout from the RTD sensors.

6. The microfluidic thin label of claim 5, wherein the desired set temperature of each sample tube is manually coded into the RFID tag of the tube.

7. A test tube which comprises the microfluidic thin label of claim 6 mounted or directly printed on the outside surface of the test tube.

8. An intelligent portable carrier device comprising:

a) a housing including a lid-closure mechanism, wherein the housing is configured to hold test tubes, and comprises means for tracking and monitoring said test tubes using product identification technology to uniquely identify said test tubes as they are added to or removed from the device;

b) a battery pack configured to directly power the electronic memory labels mounted or directly printed on the outside surface of the test tubes; and c) a microcontroller/computer having an integrated wireless communication electronics configured to act as an interface between the test tube samples and a cloud server, wherein the intelligent portable carrier device comprises test tubes comprising the microfluidic thin label of claim 6 and wherein upon placing each test tube inside a given slot, the RFID tag is scanned and the set temperature communicated to the on-board microcontroller/computer, wherein instead of connecting each test tube TEC micro-cooler to its own PID controller, the intelligent portable carrier device is configured to use uses multiplexing electronics to allow all of the test tubes in the transportation box to share a single output wire.

9. The intelligent portable carrier device of claim 8, further comprising a global positioning receiver module for receiving signals from a global positioning system (GPS) and determining a location of said intelligent portable carrier device.

10. The intelligent portable carrier device of claim 8, further comprising at least one sensor module for monitoring an environmental condition within the intelligent portable carrier device.

11. The intelligent portable carrier device of claim 8, wherein said housing further comprises interior walls constructed from an RF absorptive material to contain RF emitted energy.

12. The intelligent portable carrier device of claim 8, wherein the battery pack is selected from the group consisting of solar re-chargeable batteries, wire-less chargeable batteries and magnetic chargeable batteries.

13. The intelligent portable carrier device of claim 8, wherein physical access to the intelligent portable carrier device is encrypted with access allowed only to authorized personnel.

14. The microfluidics thin film label of claim 1, wherein the metal connectors comprise copper.

15. The microfluidics thin film label of claim 5, wherein the thin film electrical conductors and copper connectors are fabricated on-film using photolithography and wet etching.

16. The intelligent portable carrier device of claim 11, wherein the RF absorptive material is carbon fiber.

17. A stretchable and wearable microfluidics thin film label for a sample tube, wherein said microfluidics thin film label is capable of being mounted or directly printed on the outside surface of the sample tube, and wherein said label comprises thin film electrical conductors and metal connectors fabricated on-film, and on the connectors: means for individually cooling and heating a test tube; means for measuring the temperature of the test tube; means for monitoring the volume of the sample within the test tube; and means to store sample information,
wherein said microfluidic thin label is capable of being mounted on the outside surface of the sample tube, and wherein said label comprises thin film electrical conductors and copper connectors fabricated on-film to add to the connectors a temperature and volume sensoring means, as well as a thermoelectric microcooler, an on-film RFID tag and a PID controller; wherein the means for measuring the temperature of the test tube is a resistance temperature detector (RTD) made of copper with a positive temperature coefficient (PTC) configured to be mounted so that this detector is in contact with the sample tube outside wall, wherein the thermoelectric micro-cooler is deposited on the film by p-type $Sb_2$, $Te_3$ and n-type $Bi_2Te_3$ films via thermal co-evaporation of the constituent elements on the connectors, wherein said thermoelectric micro-cooler is configured to be mounted so that it is in contact with the sample tube outside wall, wherein the means for monitoring the volume of the sample within the test tube is a capacitive fluid level sensor which comprises a set of thin film electrode strips configured to be mounted so that they contact with the sample tube outside wall, and wherein the PID controller is configured used to control the temperature of each sample tube based on a desired set-point and temperature readout from the RTD sensors.

18. The microfluidic thin label of claim 17, wherein the desired set temperature of each sample tube is manually coded into the RFID tag of the tube.

19. A test tube which comprises the microfluidic thin label of claim 18 mounted or directly printed on the outside surface of the test tube.

20. An intelligent portable carrier device comprising:
a) a housing including a lid-closure mechanism, wherein the housing is configured to hold test tubes, and comprises means for tracking and monitoring said test tubes are configured to use using product identification technology to uniquely identify said test tubes as they are added to or removed from the device;
b) a battery pack configured to directly power the electronic memory labels mounted or directly printed on the outside surface of the test tubes; and
c) a microcontroller/computer having an integrated wireless communication electronics configured to act as an interface between the test tube samples and a cloud server, wherein the intelligent portable carrier device comprises test tubes comprising the microfluidic thin label of claim 18 and wherein upon placing each test tube inside a given slot, the RFID tag is scanned and the set temperature communicated to the on-board microcontroller/computer, wherein instead of connecting each test tube TEC micro-cooler to its own PID controller, the intelligent portable carrier device is configured to use uses multiplexing electronics to allow all of the test tubes in the transportation box to share a single output wire.

* * * * *